March 24, 1953     M. MERZ     2,632,484
CHAIN SAW
Filed Nov. 1, 1946     3 Sheets-Sheet 1
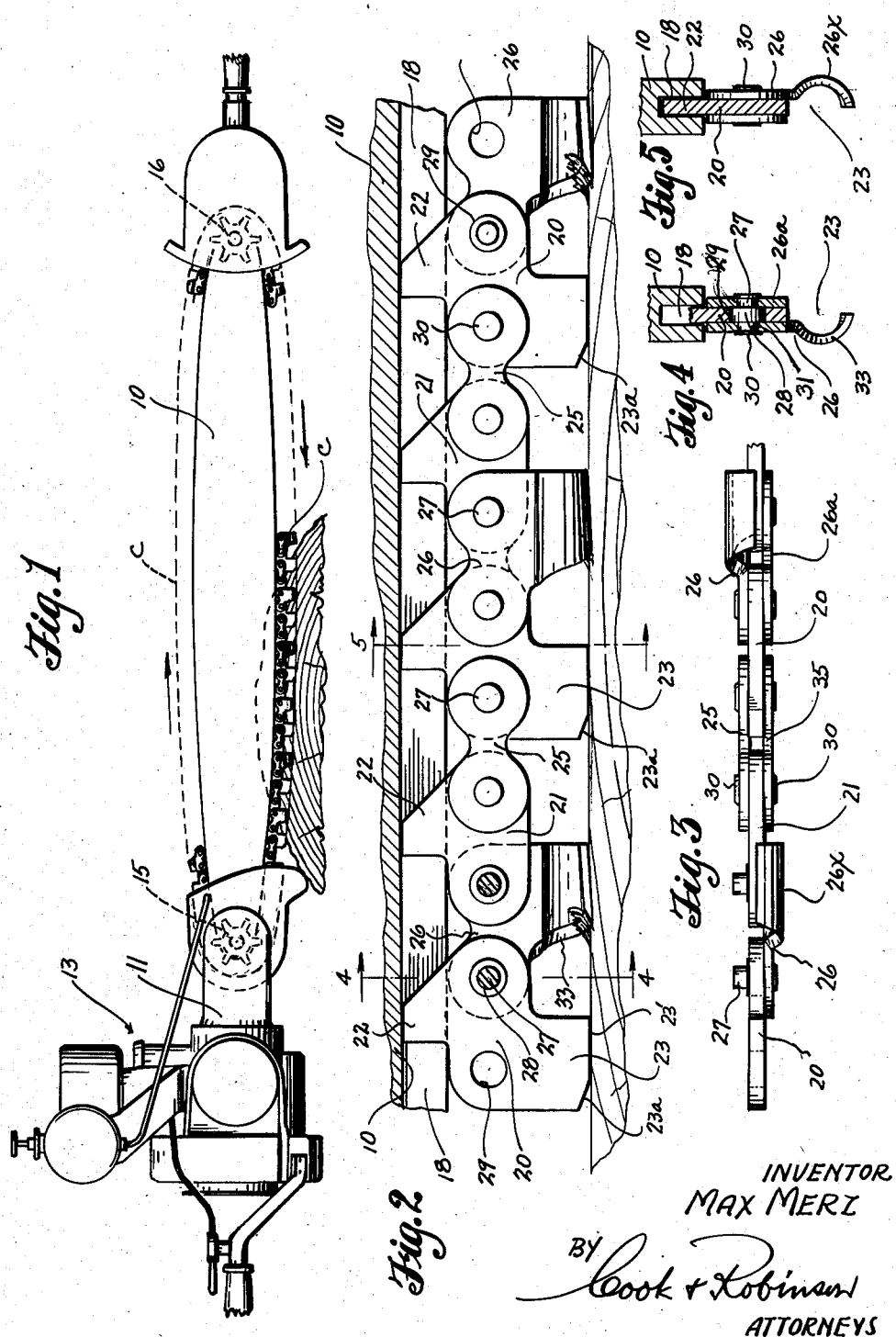
INVENTOR
MAX MERZ
BY Cook & Robinson
ATTORNEYS March 24, 1953 M. MERZ 2,632,484
CHAIN SAW
Filed Nov. 1, 1946 3 Sheets-Sheet 2
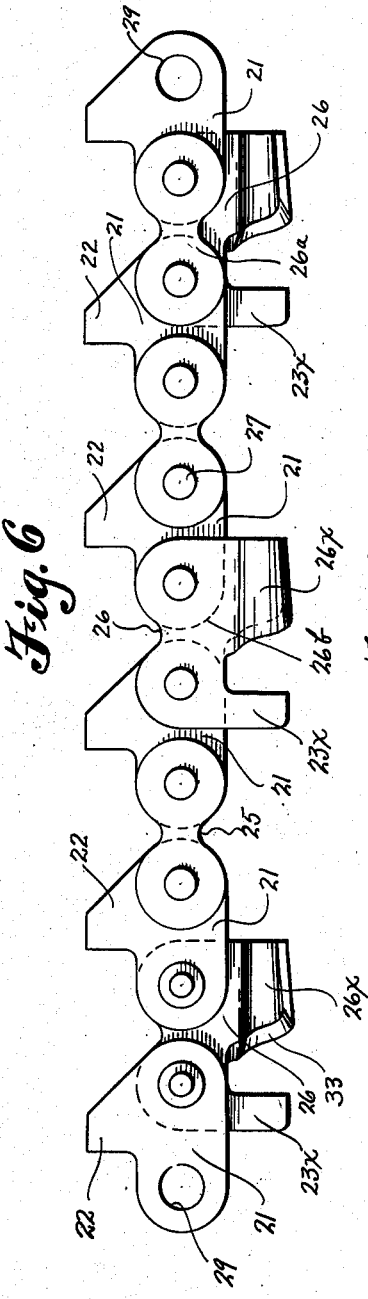
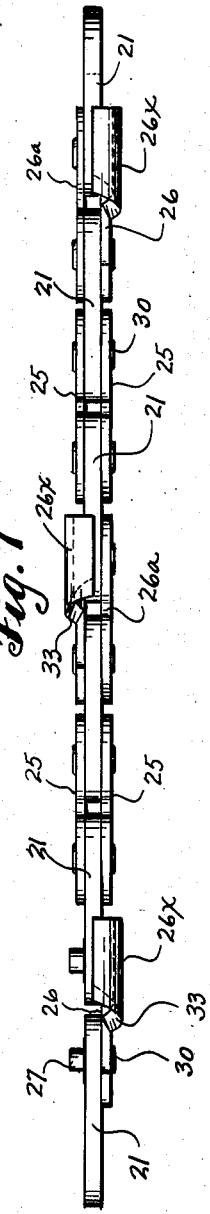
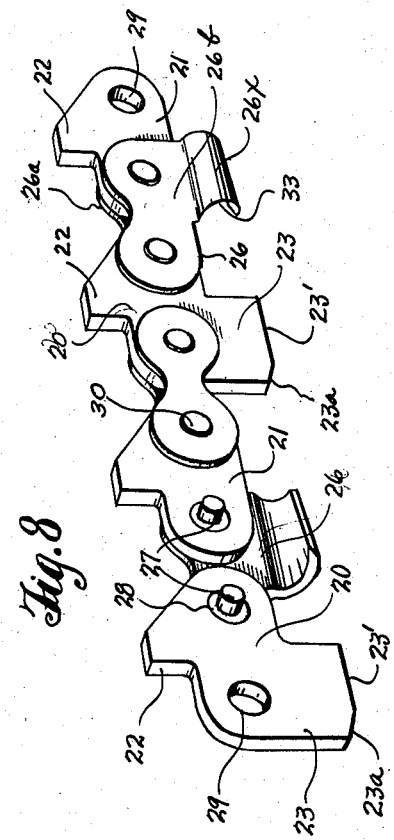
INVENTOR
MAX MERZ
BY Cook & Robinson
ATTORNEYS

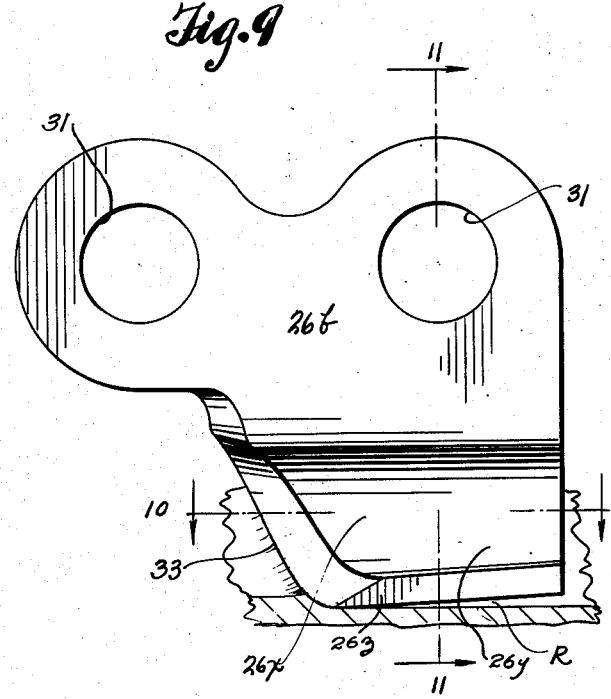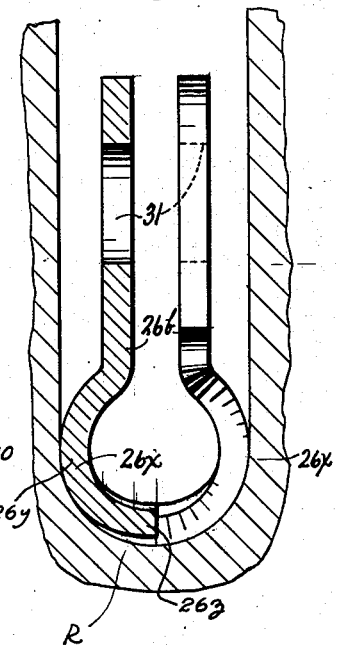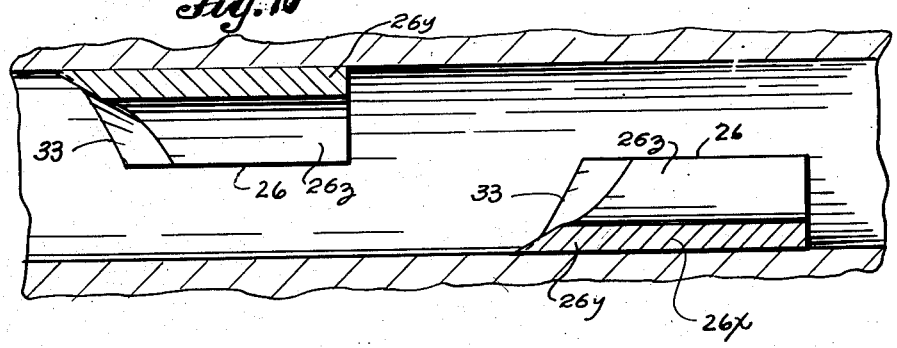

Patented Mar. 24, 1953

2,632,484

UNITED STATES PATENT OFFICE 2,632,484

CHAIN SAW

Max Merz, Seattle, Wash., assignor to Engineering Research Inc., Seattle, Wash.

Application November 1, 1946, Serial No. 707,112

5 Claims. (Cl. 143—135)

This invention relates to saws and it has reference more particularly to improvements in power driven saws of that kind known in the lumber and logging industries as "chain saws" and which are especially designed for the falling of trees, the bucking of logs and for various other sawing operations; the invention pertaining especially to improvements in the design and functional relationship of the links making up the saw chain and to the wood cutting elements that are incorporated with some of the links.

It is the principal object of this invention to provide novel and improved forms of cutting elements for wood sawing chains that make possible a smoother and faster cutting operation and requiring less power to drive the saw than for similar types of saws.

Another object is to design cutting elements, in "rights" and "lefts" and to dispose them alternately at opposite sides of the chain, each to cut the corresponding side and bottom portion of the kerf with a shearing cut and to remove the shavings therefrom.

It is also an object of the invention to facilitate the sawing or cutting operation by the provision of cutting elements in "rights" and "lefts" as above stated and wherein each element is formed with a continuous, angularly inclined cutting edge that is designed, as the chain advances, to plane off a side and bottom surface portion of the kerf as a continuous operation; the cutting elements at opposite sides of the chain thus co-operating to define a kerf that has a semi-cylindrically rounded bottom surface.

Specifically stated, the objects of the present invention reside in the provision of a chain saw, made up of a succession of pivotally joined links, certain ones of which, located alternately at opposite sides of the chain, embodying the sawing or cutting elements therewith; each cutter having a blade portion of substantial length in the longitudinal direction of the chain to give stability to the travel of the chain and its cutting operation, and substantially semi-cylindrical in form and provided with a sharpened forward edge for cutting away both a side and bottom portion of the kerf. Furthermore, the semi-cylindrical blades, as arranged along the chain at opposite sides, being outwardly curved and each formed without rake or clearance along the longitudinal medial line of its outside surface in order that it may ride flatly against the side wall of the kerf and the cutting edge thereby held against gouging, but having a slight angle of rake or clearance below this line and rearwardly from the cutting edge to make the planing action possible.

Still further objects and advantages of the present invention reside in the provision of a saw chain including depth gauge links of novel form alternating with the links that are equipped with the cutting elements or having depth gauge runners incorporated with the cutter equipped links.

Still further objects reside in the details of construction and combination of parts as will hereinafter be fully described.

In accomplishing the various objects of the invention, I have provided the improved details of construction, the preferred forms of which are illustrated in the accompanying drawings, wherein:

Fig. 1 is a side view of a power driven saw equipped with a saw chain embodying therein the novel features of the present invention.

Fig. 2 is an enlarged side view of a part of the saw chain, showing it as applied to the guide groove of the mounting blade and as engaged with a log for a sawing operation.

Fig. 3 is an edge view of a section of the saw chain, showing the spaced relationship and the alternate arrangement of the wood cutting elements at opposite sides of the chain.

Fig. 4 is a cross-section of the saw chain taken on the line 4—4 in Fig. 2.

Fig. 5 is a cross-section of the saw chain taken on the line 5—5 in Fig. 2.

Fig. 6 is a side view of a section of a saw chain of an alternative form, wherein the depth gauge runners are incorporated in the links which are equipped with the cutters.

Fig. 7 is an edge view of the chain as shown in Fig. 6.

Fig. 8 is a perspective view of a portion of the saw chain shown in Figs. 1 to 5.

Fig. 9 is an enlarged view of one of the cutter links of the chain of Fig. 2, as seen from the inside and illustrating the angle of rake given the cutter blade.

Fig. 10 is a horizontal section taken on line 10—10 in Fig. 9 showing the cutter in line contact with the side wall of the kerf.

Fig. 11 is a cross-section taken on line 11—11 in Fig. 9.

Referring more in detail to the drawings:

For a better understanding of the present improvements, I have shown, in Fig. 1, the type of saw for which the present saw chain is adapted for use. In this view, 10 designates the saw bar, or blade and 11 designates a frame to which one end of the blade is suitably fixed for the intended use of the saw. Supported by the frame is an engine of suitable kind, designated generally by reference numeral 13, that operates, through suitable power transmission devices not herein shown, to rotatably drive a sprocket wheel 15 that is located in the frame adjacent the inner end of the blade. At the outer end of the blade, a sprocket wheel 16 is rotatably mounted. The saw chain designated generally by reference character "C" in Fig. 1, is of continuous, link belt form and extends about the sprocket wheels 15 and 16 and along the opposite longitudinal edges of the blade 10.

The blade, as shown in Figs. 2, 4 and 5, is formed with deep grooves 18 in which parts of certain of the links travel to functionally guide the chain in its use as will presently be more fully explained.

Referring now more particularly to the present preferred type of saw chain as shown best in Figs. 2 and 3: the chain belt "C" comprises a central row of alternately arranged depth guage links 20 and spacer links 21, all of which are perfectly flat and are equipped at their inner edges with extended wings 22 adapted for guided travel in the guide grooves 18 of the blade as shown best in Figs. 2, 4 and 5. The wings 22 lie in the plane of the body portions of the links and project from what might be termed the trailing half of the link. The forward edge of each wing is perpendicular to the line of travel and the rear edge is inclined at about a 45° angle and merges tangentially into the rounded rear end of the link, as shown best in Fig. 2.

The links 20 and 21 are alike in size and in all respects except that the depth gauge links 20 are equipped along their outer edges and forward end portions with depth gauge runners 23, each of which is of substantial length in the direction of travel of the link, and is formed with a straight outer edge surface 23' that is designed to ride flatly upon the bottom surface of the kerf as cut by the saw to steady the run of the chain and accurately determine the depth of the cut to be made by the following cutter, and this edge 23' terminates, at its forward end, in a short, beveled surface 23a that is inclined away from the bottom of the kerf in sled runner fashion to prevent any possible gouging.

It will be understood by reference to Fig. 3, that the links 20 and 21, including their guide wings 22 and depth gauge runners 23, are perfectly flat and in exact alignment in the center line of the chain. Each spacer link 21 is joined to the next following depth gauge link 20 by a pair of connector links 25—25 located at opposite sides of the chain. Likewise, each depth gauge link 20 is joined to the next following spacer link 21 by a connector link and a cutter link arranged at opposite sides of the chain; these being designated by reference numerals 26a and 26, respectively.

Successive links making up the chain are pivotally joined together by rivets 27 which have bushings 28 applied about their medial portions and pivotally contained in openings 29 in the links 20 and 21; the opposite end portions of the rivets being extended through holes 31 provided therefor in the ends of the cutter and connector links and formed with heads 30 at their outer ends whereby to hold the rivets in place.

It will be understood by reference to Figs. 2 and 3, that the cutter links 26, as incorporated in the chain alternate at opposite sides thereof and are formed as "right side" and "left side" links, and each is equipped with a cutter blade of novel kind. The details of the blades will now be described more particularly with reference to Figs. 9, 10 and 11, wherein it is shown that each cutter link comprises a flat body portion 26b, formed with the holes 31 through its opposite end portions to receive the end portions of the link joining rivets 27, and having a blade or cutter portion 26x extended from the outer edge of the body. This blade body portion 26x, as seen in end view from its forward end, is substantially of semi-circular form. Starting from the line of its juncture with the body portion 26b, it is outwardly and downwardly curved, substantially to semi-cylindrical form, and it terminates at its lower end with its longitudinal edge flush with the central longitudinal plane of the chain.

At its forward end, the blade body is sharpened to a cutting edge 33, as noted best in Fig. 9 and the sharpening is such that the cutting edge is at the outside edge of the blade. In other words, the sharpening bevel is on the inside of the curved blade body and not on the outside. Furthermore, the forward sharpened edge of the blade body extends from the line of the juncture of the blade and link body in a spiral direction, leading toward the rear end of the link so that from its first point of contact with the kerf wall, the blade edge is inclined rearwardly in a uniform manner, thus to make a shearing cut that, throughout the length of the sharpened edge, effects a continuous planing operation. The effective cutting edge of each cutter portion 26x extends from the point of contact with the side wall of the kerf and around the spiral of the cutter portion rearwardly to the tip of the cutting edge. In this respect the present cutter differs from the so called L-shaped cutters of chain saws now quite well known in the industry, which form two distinct cuts in making the side and bottom of the kerf.

In the alternative form of saw chain shown in Figs. 6 and 7, I employ no depth gauge links 20 as in Fig. 2, but substitute spacer links 21 therefor and incorporate depth gauge runners 23x on the forward ends of each cutter link. These runners follow in the center of the kerf and aside from determining the depth of the cut, also aid in the removal of shavings cut from the kerf.

An important detail of design of the cutters is to be found in the rake angle given the cutters and the relationship of the angle to the walls of the kerf. It has been found most desirable that the outer surface of each cylindrically curved blade body, along the central longitudinal line, be parallel with the side walls of the kerf and that it shall ride thereagainst, as has been shown in the horizontal sectional view of Fig. 10. However, from this line to the bottom edge of the blade, the body is given a slight rake angle which is shown at R in Figs. 9 and 11.

It is to be observed in Fig. 10 that the line of contact of the blade with the side wall of the kerf, extends to the full length of the blade body, and therefore the cutter will be positively guided in its travel and erratic action or gouging will be eliminated. The rake angle given the body as shown in Fig. 9, will permit the desirable planing return with the elimination of all friction. The final result is a smooth cutting, spiral cutting and auger like action of each and every cutter.

The design of the cutters, particularly in the spiral direction of the blade edge that provides the continuous shearing cut by each cutter blade to form the corresponding side portion and bottom of the kerf, is especially inducive to faster cutting and smoother operation. The long spacing of the depth gauge runners from the cutters facilitates the cleaning of material from the kerf. The provision also of line contact of the cutter blades with the kerf side walls facilitates the accurate guiding of the chain and eliminates gouging and is further inductive to stability and smoothness of operation.

Such chain saws, by actual test, have proven faster in their cutting operations and requiring less power than present day types of chain saws of like size and afford many advantages both in manufacturing and in upkeep.

Having thus described my invention, what I claim as new therein, and desire to secure by Letters Patent is:

1. In a chain saw, a cutter unit comprising a link having a longitudinal axis disposed in the direction of movement of the chain, the cutter unit including a connecting portion having inner and outer edges and a longitudinally disposed blade body extending from the outer edge thereof, a portion of which, in cross section, is on a continuous curve, the blade body having a leading portion and a leading edge, and said leading edge being sharpened to form a cutting edge conforming approximately to a portion of a spiral convolution spiralling rearwardly from the leading portion of the effective cutting edge of the blade.

2. In a chain saw, a chain comprising a plurality of interconnected links, some of which are cutter links having their longitudinal axes disposed in the direction of movement of the chain, a cutter unit on each of the cutter links and including a connecting portion having inner and outer edges and a longitudinally disposed blade body extending from the outer edge thereof and having a cross sectional portion on a continuous curve, the blade body having a leading edge which is sharpened to form a cutting edge conforming approximately to a continuously receding portion of a spiral convolution extending rearwardly from the leading portion of the effective cutting edge of the blade.

3. In a chain saw, a chain comprising a plurality of interconnected links, some of said links comprising depth gauge links, others of said links are cutter links having their longitudinal axes disposed in the direction of movement of the chain, a cutter unit on each of the cutter links and including a connecting portion having inner and outer edges and a longitudinally disposed blade body extending from the outer edge thereof and having a cross sectional portion on a continuous curve, the laterally outward side surface of said blade body comprising a guide surface for said cutter unit relative to the side of a kerf being cut, the blade body having a leading portion and a leading edge which is sharpened to form a cutting edge conforming approximately to a portion of a spiral convolution beginning at the leading portion of the effective cutting edge of the blade and continuously receding from said forward inner end.

4. In a saw chain, a pair of longitudinally aligned spaced apart links each including an integral sprocket engaging root portion extending outwardly beyond one edge thereof and in the same plane therewith, a pair of oppositely disposed side plates each having a substantially flat portion pivotally, contactingly and directly, joining said links together, one plate of said pair of plates having an integral longitudinally elongated cutting tooth thereon, the cutting tooth extending inwardly beyond another edge of the link which edge is opposite the first mentioned edge of the link, the cutting tooth including an intermediate longitudinally elongated curved portion having leading and trailing ends, the curved portion extending outwardly in the opposite direction with respect to an outer side of said links and an integral longitudinally elongated end portion extending beyond the intermediate portion with the said end portion extending back over said links in outwardly spaced relationship thereto and the leading end of said cutting tooth being in the form of a chisel cutting edge and with a portion of the chisel edge extending on opposite sides of the flat portion of the plate.

5. In a chain saw, a cutter unit comprising a link having a longitudinal axis disposed in the direction of movement of the chain, the cutter unit including a connecting portion having inner and outer edges and a longitudinally elongated cutting tooth thereon extending from the outer edge thereof, the cutting tooth including an intermediate longitudinally elongated curved portion having leading and trailing ends, the curved portion extending outwardly in the opposite direction with respect to an outer side of the link and an integral longitudinally elongated end portion extending beyond the intermediate portion with the end portion extending back over the link in outwardly spaced relationship thereto and the leading end of the cutting tooth being in the form of a chisel cutting edge and with a portion of the chisel edge extending on opposite sides of the link.

MAX MERZ.

REFERENCES CITED

The following references are of record in the file of this patent:

UNITED STATES PATENTS

| Number | Name | Date |
|---|---|---|
| 31,073 | Brown | Jan. 8, 1861 |
| 312,133 | Ledward | Feb. 10, 1885 |
| 485,503 | Lewis | Nov. 1, 1892 |
| 591,039 | Harris | Oct. 5, 1897 |
| 2,321,962 | Zandecki | June 15, 1943 |
| 2,326,854 | Hassler | Aug. 17, 1943 |

FOREIGN PATENTS

| Number | Country | Date |
|---|---|---|
| 8,194 | Great Britain | of 1894 |